United States Patent [19]

Mentzer

[11] Patent Number: 5,535,086
[45] Date of Patent: Jul. 9, 1996

[54] ESD PROTECTION CIRCUIT AND METHOD FOR BICMOS DEVICES

[75] Inventor: Ray A. Mentzer, Portland, Me.

[73] Assignee: National Semiconductor Corp., Santa Clara, Calif.

[21] Appl. No.: 310,646

[22] Filed: Sep. 22, 1994

[51] Int. Cl.$^6$ .................. H02H 3/20; H02H 9/02
[52] U.S. Cl. .............. 361/91; 361/111; 330/207 P; 330/298; 257/357; 257/360
[58] Field of Search .................. 361/91, 56, 58, 361/111, 113; 330/298, 207 P; 257/355–363

[56] References Cited

U.S. PATENT DOCUMENTS

| | | |
|---|---|---|
| 4,636,825 | 1/1987 | Baynes . |
| 4,875,130 | 10/1989 | Huard . |
| 5,105,328 | 4/1992 | Schoofs .................. 361/91 |

*Primary Examiner*—Jeffrey A. Gaffin
*Assistant Examiner*—Michael J. Sherry
*Attorney, Agent, or Firm*—Daniel H. Kane, Jr.; Chris A. Caseiro

[57] ABSTRACT

An ESD protection circuit for a BICMOS IC device protects NMOS transistors (Q2) of internal CMOS gates (G2) from ESD events at a high potential power rail (VCC). Specifically the ESD protection circuit protects NMOS pulldown transistors coupled between a pullup bipolar emitter follower transistor (Q5) and the low potential power rail (GND). A PMOS current control transistor (QPESD) is coupled with primary current path between the high potential power rail (VCC) and the bipolar emitter follower transistor (Q5) for controlling current flow through the emitter follower transistor. An RC time constant circuit (R10,C1) is coupled between the high potential power rail (VCC) and low potential power rail (GND). The RC time constant circuit is constructed with a time constant for following power up events but not for following the faster ESD events at the high potential power rail. An inverting gate (G2A) is coupled between the control gate node of the PMOS current control transistor (QPESD) and the RC time constant circuit (R10,C1) for turning off the PMOS current control transistor (QPESD) during an ESD event at the high potential power rail. The PMOS current control transistor (QPESD) thereby protects NMOS transistors (Q2) of internal CMOS gates (G2) coupled to the pullup emitter follower transistor (Q5).

12 Claims, 1 Drawing Sheet

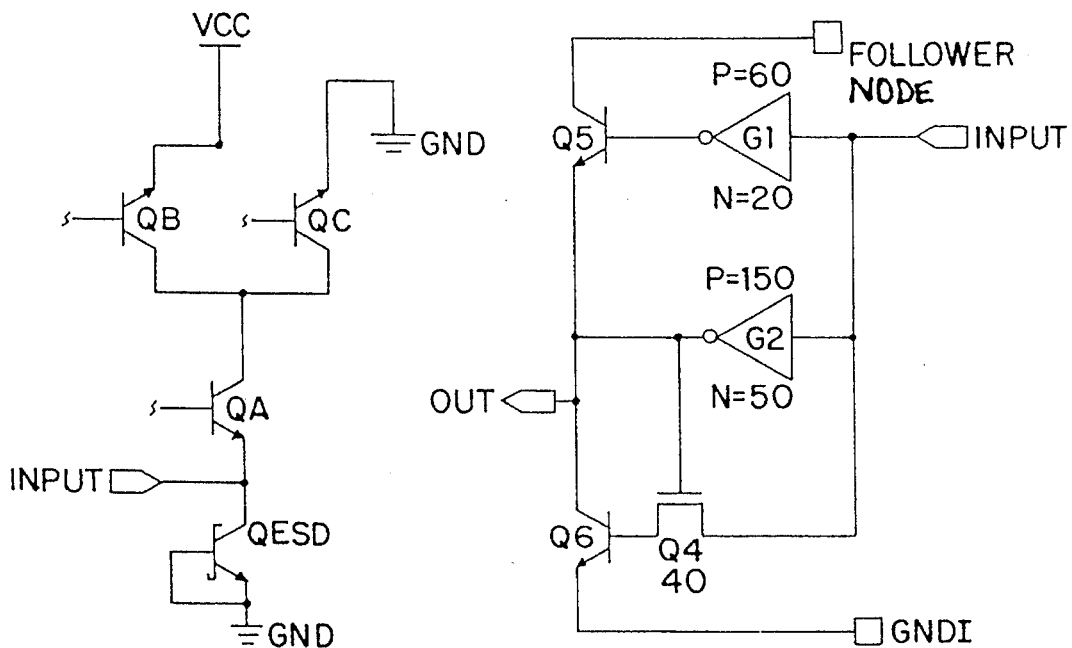
FIG 1 (PRIOR ART)
FIG 3
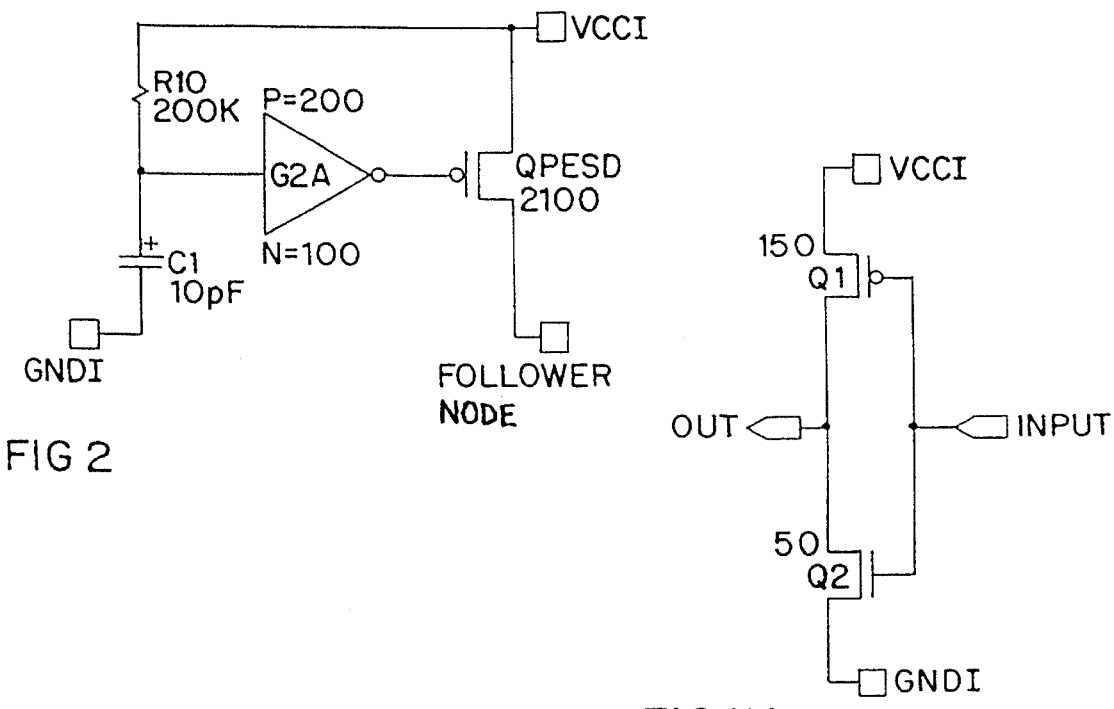
FIG 2
FIG 3A 5,535,086

ESD PROTECTION CIRCUIT AND METHOD FOR BICMOS DEVICES

TECHNICAL FIELD

This invention relates to a new electrostatic discharge (ESD) protection circuit for internal MOS transistors of BICMOS devices. The invention supplements conventional ESD protection at the pads of integrated circuit (IC) devices incorporating both CMOS and bipolar technology. Specifically, the invention protects NMOS pulldown transistors of internal CMOS gates from the low impedance current path through bipolar emitter follower pullup transistors typically used at the output of BICMOS inverters. During the spike voltage of an ESD event at the high potential power rail, a PMOS or P channel transistor turns off the emitter follower primary current path thereby protecting the NMOS devices.

BACKGROUND ART

Electrostatic discharge (ESD) protection is conventionally provided at the bond pads or adjacent input and output lines of integrated circuit devices to protect input and output transistors from ESD spike voltages exceeding the dielectric breakdown voltage of input and output transistors. The dielectric breakdown voltage for the gate oxide layer which provides the channel insulating layer for MOS transistors is typically in the range of 15 volts. During handling of IC devices, the bond pads coupled to the outside world may receive electrostatic discharges causing positive and negative transient voltage spikes greatly exceeding this dielectric breakdown voltage. A characteristic of the voltage spikes from ESD events is the fast rise time for example in the order of 5nS to 15nS while normal power up and power down events in the power rails are typically in the order of microseconds.

A variety of ESD protection circuit arrangements have been devised for diverting to the respective power rails ESD voltages appearing at the bond pads and adjacent input and output lines. A simplified ESD protection circuit is provided for example by clamping the input or output line at the respective bond pad using ESDP diodes. For example current flow is oriented from the bond pad through a first diode to the high potential power rail for ESD events at the bond pad exceeding the voltage VCC on the high potential power rail. A second ESDP diode is oriented for current flow from ground to the bond pad for negative voltage spikes.

Further background on ESD protection is discussed for example, in the Jeffrey B. Davis and Stephen C. Park U.S. patent application Ser. No. 08/122,120, filed Sep. 16, 1993 for ELECTROSTATIC DISCHARGE PROTECTION TRANSISTOR ELEMENT FABRICATION PROCESS. Davis et al. describe an electrostatic discharge protection transistor element also used for clamping an input or output line of an IC device for diverting ESD voltages before occurrence of dielectric breakdown voltages at the internal transistor elements. The Davis et al. ESDP transistor solves other problems caused by clamping diodes during power up and power down of an IC device.

Variations on similar ESD protection circuits are described in the Huard U.S. Pat. No. 4,875,130 issued Oct. 17, 1989 for ESD LOW RESISTANCE INPUT STRUCTURE. A BICMOS ESD protection circuit is described in the James R. Ohannes et al. U.S. patent application Ser. No. 07/839,825 filed Feb. 21, 1992 for BICMOS ESDP CIRCUIT.

A more elaborate ESD protection circuit for use at the input or output lines adjacent to bond pads is illustrated in FIG. 1. This circuit is described in the Stephen W. Clukey U.S. patent application Ser. No. 08/184,261 filed Jan. 21, 1994 for MULTIRAIL ESDP DEVICE. For ESD protection the circuit of FIG. 1 uses three bipolar transistors QA, QB, QC with emitters coupled respectively to the input line to be protected, the high potential power rail VCC, and the low potential power rail GND. The respective collector nodes of the three bipolar transistors QA, QB, QC are coupled together at a common node. By this Y network arrangement the voltage path in any direction across the network is equal to VEC+VCE. With the bases of the bipolar transistors floating, the breakdown voltage across any path of the Y network is approximately 10 volts. This permits diversion of both positive and negative ESD voltages before the ESD voltage can rise above the dielectric breakdown voltage of internal MOS transistors. A diode connected Schottky transistor can also be coupled between the input line to be protected and ground for further protection from negative voltage spikes.

While the foregoing circuits can provide bond pad protection to input and output transistors for ESD events up to the standard of 2000 volts and even greater, e.g. up to 4000 volts, a further difficulty has been encountered in more recent BICMOS circuits that incorporate both bipolar technology and MOS technology. Specifically during ESD testing there is consistent failure of internal NMOS pulldown transistors that are coupled to bipolar emitter follower pullup transistors. During ESD events the N channel transistors breakdown because of the voltage across the source and drain and the low impedance bipolar emitter followers used as pullup transistors source sufficient current to fuse the source and drain of the N channel transistors. This problem encountered with BICMOS technology is not resolved by the conventional ESD protection circuits at the bond pad input and output lines.

OBJECTS OF THE INVENTION

It is therefore an object of the present invention to provide a supplemental ESD protection circuit for protecting the NMOS pulldown transistors of internal CMOS gates that are coupled to bipolar emitter follower pullup transistors in BICMOS circuits. The new ESD protection circuit is intended to supplement the existing bond pad ESD protection at input and output lines of BICMOS devices.

Another object of the present invention is to protect the NMOS pulldown transistors of internal CMOS gates by blocking the low impedance current path through bipolar emitter follower pullup transistors during ESD events.

A further object of the invention is to provide the supplemental ESD protection without substantially impacting the AC operation and speed for example of BICMOS inverter circuits of the BICMOS device.

DISCLOSURE OF THE INVENTION

In order to accomplish these results the present invention provides an ESD protection circuit for a BICMOS IC device for protecting NMOS transistors of internal CMOS gates from ESD events at a high potential power rail. The invention is directed to N channel or NMOS transistors that are coupled between a pullup bipolar emitter follower transistor and a low potential power rail.

According to the invention a PMOS current control transistor is coupled with the primary current path between the high potential power rail and the bipolar emitter follower transistor for controlling current flow through the emitter follower transistor. An RC time constant circuit is coupled between the high potential power rail and low potential power rail. The RC time constant circuit is constructed with a time constant for following power up events but not for following the faster ESD events at the high potential power rail.

The invention provides an inverting gate coupled between a control gate node of the PMOS current control transistor and the RC time constant circuit. The inverting gate is coupled for turning off the PMOS current control transistor during an ESD event at the high potential power rail thereby protecting NMOS transistors coupled to the emitter follower transistor. Because of the relatively long time constant, the inverting gate input during an ESD event becomes a logic low potential level relative to the rapid rise at VCC, the inverting gate output becomes logic high, and the PMOS current control transistor turns off.

The PMOS current control transistor of the ESD protection circuit is selected to have a relatively large channel width and current carrying capacity for negligible degradation in the switching speed of a circuit in which the emitter follower transistor is a component. The PMOS current control transistor is normally conducting in the absence of ESD events permitting substantially normal switching speed by the emitter follower transistor. By way of example it has been found that degradation of AC switching speed of a BICMOS inverter is negligible, i.e. <100pS and even <75pS.

The RC time constant circuit of the ESD protection circuit is typically constructed with a time constant in microseconds (µS) or greater so that the RC time constant circuit cannot track the rise time of ESD events which are typically in nanoseconds (nS). As a result the inverter output becomes logic high and turns off the PMOS current control transistor during a rapid rise in voltage at the high potential power rail. The emitter follower therefore cannot source destructive current through NMOS pulldown transistors of internal CMOS gates. On the other hand the RC time constant circuit follows power up and power down events at the high potential power rail turning on the PMOS current control transistor during normal operation of the BICMOS circuit.

The RC time constant circuit typically comprises a resistor and capacitor coupled in series between the high potential power rail VCC and low potential power rail GND. The control gate node of the PMOS current control transistor is coupled by the inverter gate to the node between the resistor and capacitor.

The invention also contemplates a variety of configurations of the P channel current control transistor. The PMOS current control transistor may be a large channel width transistor serving a number of bipolar emitter follower transistors in the BICMOS circuit. Alternatively the PMOS current control transistor can be fabricated as a distributed transistor with multiple PMOS transistor elements controlling respective multiple emitter follower transistors.

The invention also provides a new method of protecting NMOS transistors of internal CMOS gates coupled to bipolar emitter follower pullup transistors in BICMOS circuits. According to the method the impedance through the current path of the emitter follower transistor is increased during ESD events and decreased during normal operation of the BICMOS circuit. The method includes controlling the current flow through the emitter follower transistor using a P channel transistor, controlling the gate of the PMOS transistor so that it is normally on when the high potential power rail is powered up, and turning off the PMOS transistor in response to a rapid rise in voltage at the high potential power rail caused by an ESD event.

Tests were conducted using the new supplemental ESD protection circuit as follows. Without the new supplemental circuit, BICMOS devices incorporating only the ESD protection of FIG. 1 were tested. It was found that the internal NMOS transistors fused and failed at ESD test voltage spikes up to 1 KV. Then BICMOS devices were tested with the new supplemental ESD protection circuit. It was found that internal NMOS transistors did not fail until at least 3 KV, far above the standard specification of 2 KV.

Other objects, features and advantages of the invention are apparent in the following specification and accompanying drawings.

BRIEF DESCRIPTION OF THE DRAWINGS

FIG. 1 is a schematic circuit diagram of a prior art ESD protection circuit described in the Stephen W. Clukey U.S. patent application Ser. No. 08/184,261 filed Jan. 21, 1994 for MULTIRAIL ESDP DEVICE.

FIG. 2 is a schematic circuit diagram of the supplemental ESD protection circuit for controlling current flow through a bipolar emitter follower transistor of a BICMOS circuit.

FIG. 3 is a schematic circuit diagram of a BICMOS invertor to be coupled to the supplemental ESD protection circuit of FIG. 2.

FIG. 3A is a detailed circuit diagram of the CMOS gate G2 of FIG. 3 showing the vulnerable NMOS pulldown transistor Q2 protected by the ESD protection circuit of FIG. 2.

DESCRIPTION OF PREFERRED EXAMPLE EMBODIMENTS AND BEST MODE OF THE INVENTION

A supplemental ESD protection circuit according to the invention is illustrated in FIG. 2. The PMOS current control transistor QPESD is coupled with the primary current path between the high potential power rail VCCI and a pullup bipolar emitter follower transistor not shown in FIG. 2 but designated Q5 in FIG. 3. As illustrated in FIGS. 2,3 and 3A, MOS transistors are shown by way of example with a channel width number in microns. Transistor QPESD is constructed by way of example with a relatively large channel width of 2100 µ. As hereafter described transistor QPESD is conducting during normal operations of the BICMOS device. The relatively large channel width in current carrying capacity has only minimal or negligible impact on the switching speed and AC operation of the bipolar emitter follower transistor element and accompanying BICMOS inverter.

The control gate node of transistor QPESD is coupled to the output of an inverter gate G2A. FIG. 2 shows exemplary channel widths of the P channel and N channel transistors of the inverting gate in microns. The input of inverter gate G2A is coupled to the RC time constant circuit as hereafter described.

The RC time constant circuit consists of resistor R10 and capacitor C1 coupled in series between the high potential power rail VCCI and low potential power rail GNDI. Exemplary values for the resistor R10 of 200K ohms and for the capacitor C1 of 10 picofarads (pF) results in a time constant for example in the order of 200 μS. The relatively long time constant prevents the input of inverter gate G2A from tracking or following an ESD event at the power rails. Such an ESD event has a fast rise time typically in the range of for example from 5nS to 15nS. The time constant may be greater, e.g. in milliseconds, but not too long or too slow to interfere in operation of the BICMOS device or power up of the circuit.

Operation of the ESD protection circuit of FIG. 2 is as follows. During normal operation the input of inverter gate G2A follows the power up of power rail VCCI to a logic high potential level. With the output of inverting gate G2A low the current control transistor QPESD is conducting and does not interfere in the normal operation of a bipolar emitter follower transistor, for example part of a BICMOS output buffer circuit.

Upon occurrence of an ESD event with rapid rise of voltage in the high potential power rail VCCI, the input of inverting gate G2A fails to track the rise in voltage at the high potential power rail VCCI because of the relatively long time constant of the RC time constant circuit. The input to gate G2A therefore becomes a logic low potential level relative to VCCI. The output of inverter gate G2A rises to the voltage level of VCCI becoming a logic high potential level input to the control gate node of transistor QPESD. The current control transistor QPESD therefore turns off blocking current to one or more emitter followers coupled to the follower node shown in FIG. 2 and designated FOLLOWER NODE.

The follower node of FIG. 2 is typically coupled to one or more follower nodes as shown at FOLLOWER NODE in FIG. 3. FIG. 3 illustrates a typical BICMOS inverter or buffer having bipolar output pullup and pulldown transistors Q5,Q6. An input signal controls the base of bipolar pullup transistor Q5 through CMOS inverter gate G1. The input signal also controls the base node of output pulldown transistor Q6 through passgate Q4. It is noted that the bipolar output pullup transistor Q5 is coupled in emitter follower configuration.

During an ESD event it is the NMOS transistor of inverting gate G2 that is vulnerable to destructive current passing through emitter follower pullup transistor Q5. The inverting gate G2 is shown in further detail in FIG. 3A. The NMOS pulldown transistor Q2 of inverting gate G2 is coupled between the low impedance current path through bipolar output pullup emitter follower transistor Q5 and the low potential power rail GNDI. During an ESD event for example a spike rising to 1000 to 3000 volts, a substantial current might otherwise pass through bipolar emitter follower transistor Q5 sufficient to fuse the source and drain and destroy NMOS transistor Q2 of the internal CMOS gate G2.

According to the circuit of FIG. 2 however such an ESD event in the high potential power rail VCCI causes the PMOS current control transistor QPESD to turn off blocking the low impedance current path through bipolar emitter follower transistor Q5. The only current passing through pullup transistor Q5 is therefore the base current. The destructive β amplification of current through emitter follower transistor Q5 which might otherwise cause failure of the NMOS transistor Q2 in CMOS gate G2 is prevented. The protection is afforded for both positive and negative going spikes because of the relative difference in voltage between the power rails VCCI and GNDI.

The current control transistor QPESD can be constructed as a single large transistor for handling multiple emitter follower transistor current paths or as a distributed transistor. By way of example the distributed transistor can be constructed as set forth in the Martin J. Baynes U.S. Pat. No. 4,636,825 issued Jan. 13, 1987 for DISTRIBUTED FET STRUCTURE. The specification of that patent is incorporated by reference as an example of the distributed transistor structure. The channel width of the distributed transistor is appropriately divided for handling multiple emitter follower transistor current paths. Either lumped or distributed, the channel width of current control transistor QPESD is sufficiently large so that any impact on the AC operation of the accompanying BICMOS circuit is negligible.

While the invention has been described with reference to particular example embodiments it is intended to cover all modifications and equivalents within the scope of the following claims.

I claim:

1. An ESD protection circuit for a BICMOS IC device for protecting an NMOS transistor of an internal CMOS gate from ESD events at a high potential power rail, said NMOS transistor being coupled between a pullup bipolar emitter follower transistor and a low potential power rail, comprising:

a PMOS current control transistor having a primary current path coupled between the high potential power rail and the bipolar emitter follower transistor for controlling current flow through said emitter follower transistor;

an RC time constant circuit coupled between said high potential power rail and low potential power rail, said RC time constant circuit being constructed with a time constant for following power up events but not for following the faster ESD events at the high potential power rail;

and an inverter gate coupled between the control gate node of the PMOS control transistor and the RC time constant circuit for turning off the PMOS current control transistor during ESD event at the high potential power rail thereby protecting NMOS transistors coupled to said emitter follower transistor.

2. The ESD protection circuit of claim 1 wherein the PMOS current control transistor is selected to have a relatively large channel width for negligible degradation <100 ps in the switching speed of said emitter follower transistor.

3. The ESD protection circuit of claim 1 wherein the PMOS current control transistor is constructed as a distributed transistor for controlling current through multiple emitter follower transistors.

4. The ESD protection circuit of claim 1 wherein the RC time constant circuit is constructed with a time constant in microseconds (μS) or greater so that the RC time constant circuit cannot track the rise time of ESD events in nanoseconds (ns).

5. The ESD protection circuit of claim 1 wherein the RC time constant circuit comprises a resistor and capacitor coupled in series between the high potential power rail and low potential power rail, and wherein the control gate node of the PMOS current control transistor is coupled by the inverter gate to the node between said resistor and capacitor.

6. An ESD protection circuit for a BICMOS IC device for protecting an NMOS transistor of an internal CMOS gate from ESD events at a high potential power rail, said NMOS transistor being coupled between a pullup bipolar emitter follower transistor and a low potential power rail, comprising:

a PMOS current control transistor having a primary current path coupled between the high potential power rail and the bipolar emitter follower transistor for controlling current flow through said emitter follower transistor, said PMOS current control transistor being selected to have a relatively large channel width for negligible degradation in the switching speed of said BICMOS IC device;

an RC time constant circuit coupled between said high potential power rail and low potential power rail, said RC time constant circuit being constructed with a time constant for following power up events but not for following the faster ESD events at the high potential power rail, said RC time constant circuit comprising a resistor and capacitor coupled in series between the high potential power rail and low potential power rail;

and an inverter gate coupled between the control gate node of the PMOS current control transistor and the RC time constant circuit for turning off the PMOS current control transistor during ESD events at the high potential power rail thereby protecting NMOS transistors coupled to said emitter follower transistor, said inverter gate being coupled to the node between the resistor and capacitor of the RC time constant circuit.

7. The ESD protection circuit of claim 6 wherein the PMOS current control transistor is constructed as a distributed transistor for controlling current through multiple emitter follower transistors.

8. A method of protecting an NMOS transistor of an internal CMOS gate from ESD events at a high potential power rail where the NMOS transistor is coupled between a pullup bipolar emitter follower transistor and a low potential power rail of a BICMOS IC device comprising the steps of:

increasing impedance through a primary current path of the emitter follower transistor during ESD events at the high potential power rail using a PMOS transistor coupled in the primary current path;

decreasing impedance through the primary current path of the emitter follower transistor during normal operation of the BICMOS IC device using the PMOS transistor coupled in the primary current path;

inverting a voltage between the high potential power rail and the gate node of the PMOS transistor;

delaying a change in voltage at the gate node of the PMOS transistor so that the change in voltage at the gate node of the PMOS transistor follows normal power up and power down events at the high potential power rail but cannot follow ESD events at the high potential power rail.

9. The method of claim 8 comprising increasing and decreasing the impedance in the primary current path of the emitter follower transistor using a PMOS transistor coupled in said primary current path;

controlling the control gate node of the PMOS transistor so that it is normally on when the high potential power rail is powered up during normal operation of the BICMOS circuit;

and turning off the PMOS transistor in response to a rapid rise in voltage at the high potential power rail caused by an ESD event.

10. The method of claim 9 comprising controlling the control gate node of the PMOS transistor using an inverter gate having an output coupled to the control gate node of the PMOS transistor, and an input coupled to the high potential power rail through an RC time constant circuit.

11. The method of claim 10 comprising constructing the RC time constant circuit with a time constant so that the input of the inverter gate follows power up events at the high potential power rail and so that the input of the inverter gate does not follow rapidly rising ESD events at the high potential power rail.

12. The method of claim 11 wherein the RC time constant circuit is constructed for having a time constant in microseconds or greater so that the input to the inverter gate fails to follow ESD events with rise times in nanoseconds.

* * * * *